United States Patent
Nakano et al.

(10) Patent No.: US 8,877,387 B2
(45) Date of Patent: Nov. 4, 2014

(54) METHOD FOR PRODUCING LITHIUM ION SECONDARY BATTERY

(75) Inventors: Tomohiro Nakano, Okazaki (JP); Hiroki Nagai, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 224 days.

(21) Appl. No.: 13/515,900

(22) PCT Filed: Dec. 25, 2009

(86) PCT No.: PCT/JP2009/071658
§ 371 (c)(1),
(2), (4) Date: Jun. 14, 2012

(87) PCT Pub. No.: WO2011/077564
PCT Pub. Date: Jun. 30, 2011

(65) Prior Publication Data
US 2012/0295164 A1 Nov. 22, 2012

(51) Int. Cl.
*H01M 10/058* (2010.01)
*H01M 10/0585* (2010.01)
*H01M 10/0525* (2010.01)

(52) U.S. Cl.
CPC ...... *H01M 10/0585* (2013.01); *H01M 2220/20* (2013.01); *Y02T 10/7011* (2013.01); *Y02E 60/122* (2013.01); *H01M 10/0525* (2013.01)
USPC .......................................... 429/246; 29/593

(58) Field of Classification Search
USPC ...................... 429/246, 231.95; 29/593, 623.1
See application file for complete search history.

(56) References Cited

U.S. PATENT DOCUMENTS

| 2004/0137331 | A1 | 7/2004 | Han et al. |
| 2005/0147889 | A1 | 7/2005 | Ohzuku et al. |
| 2009/0142668 | A1* | 6/2009 | Ishii .......................... 429/231.8 |

FOREIGN PATENT DOCUMENTS

| JP | 2002-134091 | 5/2002 |
| JP | 2004-39492 | 2/2004 |
| JP | 2004-214190 | 7/2004 |
| JP | 2005-32593 | 2/2005 |
| JP | 2005-142047 | 6/2005 |
| JP | 2007-188864 | 7/2007 |
| JP | 2008-293997 | 12/2008 |
| JP | 2009-4360 | 1/2009 |
| JP | 2009-9947 | 1/2009 |

OTHER PUBLICATIONS

International Search Report in International Application No. PCT/JP2009/071658; Mailing Date: Mar. 2, 2010.

* cited by examiner

*Primary Examiner* — Mark F Huff
*Assistant Examiner* — Monique Wills
(74) *Attorney, Agent, or Firm* — Finnegan, Henderson, Farabow, Garrett & Dunner, LLP

(57) ABSTRACT

The method for producing a lithium ion secondary battery includes: selecting a positive electrode sheet, negative electrode sheet, and separator sheet; constructing an electrode assembly by superimposing the selected sheets; and housing the above electrode assembly in a battery case along with an electrolyte solution. In the method, at least one of the sheets is selected such that it satisfies the relationship $0.8 < a/b < 1.5$ where a and b represent the slopes of straight lines respectively that are determined in tests under the respective conditions of (1) a high-rate loading-unloading cycle and (2) a low-rate loading-unloading cycle.

6 Claims, 10 Drawing Sheets

METHOD FOR PRODUCING LITHIUM ION SECONDARY BATTERY

CROSS-REFERENCE TO RELATED APPLICATIONS

This application is a national phase application of International Application No. PCT/JP2009/071658, filed Dec. 25, 2009, the content of which is incorporated herein by reference.

TECHNICAL FIELD

The present invention relates to a method for producing a lithium ion secondary battery.

BACKGROUND ART

Lithium ion secondary batteries that are charged and discharged by the movement of lithium ions between positive and negative electrodes have become more important as an electric power source for personal computers and portable devices, and particularly as a preferred electric power source to be mounted in vehicles, because they are light weight and can provide high energy density.

Because lithium ion secondary batteries generally tend to suffer a decline in battery performance when repeatedly subjected to charging and discharging, batteries with excellent cycling characteristics that further reduce the decline in battery performance resulting from repeated charging and discharging are needed. Patent Literatures 1 to 4 can be noted as technical documents relating to lithium ion secondary batteries. Patent Literature 1, for example, discloses technology that attempts to improve cycling characteristics by prescribing characteristics relevant to separator displacement. Patent Literature 2 discloses technology that attempts to reduce the decline in battery performance and deformation of the electrode assembly caused by swelling of the separator through setting the elastic modulus of the separator at or below a given value. Patent Literature 3 discloses technology that attempts to improve cycling characteristics by prescribing the rate of change in the thickness of the separator.

PRIOR ART DOCUMENTS

Patent Literature

Patent Literature 1: Japanese Patent Application Laid-open No. 2004-039492
Patent Literature 2: Japanese Patent Application Laid-open No. 2004-214190
Patent Literature 3: Japanese Patent Application Laid-open No. 2009-009947
Patent Literature 4: Japanese Patent Application Laid-open No. 2002-134091

However, it is expected that lithium ion secondary batteries serving as a vehicle-mounted electric power source can be used in a mode accompanying use (charge and discharge) not only at a low rate, but also at a high rate (e.g., at a high output of 5 C or higher). Because the reversible absorption and desorption (typically insertion and withdrawal) of lithium ions is rapidly repeated in the positive and negative electrodes of a lithium ion secondary battery during such high rate charging and discharging, the positive and negative electrodes themselves repeatedly undergo abrupt changes in volume (swelling and contraction), and therefore the positive and negative electrodes themselves are repeatedly subjected to loading and unloading. In this case the separator that is interposed between the positive and negative electrodes is compressed by these changes in volume in the positive and negative electrodes, and the separator itself can repeatedly undergo abrupt changes in volume as well. If the electrode assembly components (positive electrode, negative electrode, and separator) do not have sufficient load bearing capacity (loading durability) against these abrupt volume changes in each component during high rate charging and discharging, they can become deformed. Consequently, battery performance can decline because of a partial lack of electrolyte (the so-called liquid shortage phenomenon) and heterogeneity in the reactions between the lithium ions and electrons in the positive and negative electrodes. Therefore, the ability to withstand repeated high rate charging and discharging is needed in each of the electrode assembly components. However, the technology disclosed in the patent literatures above is intended for use in cellular phones, etc., and is difficult to apply to a battery to be used in a mode involving repeated high rate charging and discharging such as in a vehicle-mounted electric power source.

SUMMARY OF INVENTION

The present invention was created to solve the prior art issues noted above, and an object of the present invention is to provide a method for producing a lithium ion secondary battery that considers the durability of the electrode assembly components (positive electrode, negative electrode, separator) toward repeated high rate charging and discharging.

To realize the above object, the present invention provides a method for producing a lithium ion secondary battery having an electrode assembly formed of superimposed positive and negative electrode sheets, with a separator sheet being interposed therebetween, the method comprising: selecting a positive electrode sheet, negative electrode sheet, and separator sheet; constructing an electrode assembly by superimposing the selected positive electrode sheet, negative electrode sheet, and separator sheet; and housing in a battery case the electrode assembly along with an electrolyte solution, wherein at least one of the positive electrode sheet, negative electrode sheet, and separator sheet satisfies the relationship $0.8<a/b<1.5$ when, in tests under conditions (1) and (2) below:

Condition (1) a high rate loading-unloading cycle is repeated n times ($n \geq 3$), the cycle including a step of applying a load at a rate of A [mN/second] until a given load F1 [mN] is reached, and a step of removing the load at the rate of A [mN/second] until a given load F2 [mN] is reached, and Condition (2) a low rate loading-unloading cycle is repeated n times ($n \geq 3$), the cycle including a step of applying a load at a rate of B [mN/second] ($B \leq 0.2 A$) until a given load F1 [mN] is reached, and a step of removing the load at the rate of B [mN/second] until a given load F2 [mN] is reached, a value of 100% is defined as the thickness of the sheets before starting the test, with the thickness of the sheets being the vertical axis and the number of loading-unloading cycles being the horizontal axis, the changes in the thickness of the sheets from cycles 1 to n under load F1 and the changes in the thickness of the sheets from cycles 1 to n under load F2 are plotted and extrapolated on a graph; the thickness of the sheets and the number of loading-unloading cycles corresponding to convergence points of these distributions are determined; slopes of the straight lines connecting the thickness of the sheets before starting the tests to the convergence points are determined; and when a represents the slope of the straight line in the test conducted under condition (1), and b represents the slope of the straight line in the test conducted under condition (2).

It should be noted that the term "lithium ion secondary battery" in this description refers to a secondary battery that uses lithium ions as the electrolytic ions and in which charging/discharging is realized through the migration of lithium ions between the positive and negative electrodes.

Moreover, the term "high rate loading-unloading cycle" in this description refers to a simulated cycle of the changes in load that are applied to the electrode assembly components of a lithium ion secondary battery during high rate charging/discharging (e.g., 5 C to 50 C, preferably 10 C to 30 C) during normal battery use.

Furthermore, the term "low rate loading-unloading cycle" in this description refers to a simulated cycle of the changes in load that are applied to the electrode assembly components of a lithium ion secondary battery during low rate charging/discharging (e.g., 1 C to 5 C, preferably 2 C to 3 C) during normal battery use.

In the method for producing a lithium ion secondary battery provided by the present invention, the positive electrode sheet, negative electrode sheet, and separator sheet are selected such that at least one fulfills the relationship 0.8<a/b<1.5 where a/b is the ratio of the slope a of a straight line obtained in a high rate loading-unloading cycle to the slope b of straight line obtained in a low rate loading-unloading cycle, respectively.

Electrode assembly components for which the ratio a/b lies in the above range exhibit little difference between the behavior (response) caused by changes in load during low rate charging/discharging and the behavior caused by changes in load during high rate charging/discharging. In other words, electrode assembly components that satisfy the above conditions exhibit stable performance (e.g., load bearing capacity) for a variety of charging/discharging rates, including high rate charging/discharging. A battery having an electrode assembly configured using the above components can effectively reduce battery capacity degradation even with use in a mode that includes repeated high rate charging/discharging. Therefore, a lithium ion secondary battery with even better cycling characteristics can be produced by using electrode assembly components that satisfy the above conditions.

In a preferred mode of the method disclosed herein, the above loads F1 and F2 correspond to the respective upper and lower limits of the loads that are applied to the above sheets in the predicted SOC (state of charge) range of a lithium ion secondary battery during normal use. Because this mode predicts the load (pressure) that will be applied to the electrode assembly components during normal battery use over the SOC range (e.g., approximately 20% to 90%), it provides at least one of the electrode assembly components with sufficient load bearing capacity for normal battery use and enables the production of a lithium ion secondary battery with excellent cycling characteristics. The load that is applied to the above sheets at an 80% SOC, for example, can be used as the value for the above load F1. The load that is applied to the above sheets at a 30% SOC, for example, can be used as the value for the above load F2.

In another preferred mode of the method disclosed herein, the above condition (1) can be a condition wherein a load is applied at a rate of 23.5 [mN/second] until an upper limit of 235 [mN] is reached, and after maintaining the load at the upper limit for 10 seconds, the load is removed at a rate of 23.5 [mN/second] until a lower limit of 23.5 [mN] is reached, and the load is maintained at the lower limit for 10 seconds. The above condition (2) can be a condition wherein a load is applied at a rate of 2.35 [mN/second] until an upper limit of 235 [mN] is reached, and then the load is removed at a rate of 2.35 [mN/second] until a lower limit of 23.5 [mN] is reached.

Moreover, in one preferred mode of the method disclosed herein, the above positive electrode sheet, negative electrode sheet, and separator sheet are selected such that any one satisfies the relationship 0.8<a/b<1.5. By selecting electrode assembly components that all satisfy the relationship 0.8<a/b<1.5, a lithium ion secondary battery can be produced that has excellent cycling characteristics wherein the decline in battery performance due to repeated use in a mode comprising high rate charging/discharging is even further reduced.

In a different aspect, the present invention provides a lithium ion secondary battery having an electrode assembly formed of superimposed positive and negative electrode sheets, with a separator sheet being interposed therebetween. In the lithium ion secondary battery provided by the present invention, at least one of the positive electrode sheet, negative electrode sheet, and separator sheet satisfies the relationship 0.8<a/b<1.5 when, in tests under conditions (1) and (2) below:

Condition (1) a high rate loading-unloading cycle is repeated n times (n≥3), the cycle including a step of applying a load at a rate of A [mN/second] until a given load F1 [mN] is reached, and a step of removing the load at the rate of A [mN/second] until a given load F2 [mN] is reached, and Condition (2) a low rate loading-unloading cycle is repeated n times (n≥3), the cycle including a step of applying a load at a rate of B [mN/second] (B≤0.2 A) until a given load F1 [mN] is reached, and a step of removing the load at the rate of B [mN/second] until a given load F2 [mN] is reached, a value of 100% is defined as the thickness of the sheets before starting the test, with the thickness of the sheets being the vertical axis and the number of loading-unloading cycles being the horizontal axis, the changes in the thickness of the sheets from cycles 1 to n under load F1 and the changes in the thickness of the sheets from cycles 1 to n under load F2 are plotted and extrapolated on a graph; the thickness of the sheets and the number of loading-unloading cycles corresponding to convergence points of these distributions are determined; slopes of the straight lines connecting the thickness of the sheets before starting the tests to the convergence points are determined; and when a represents the slope of the straight line in the test conducted under condition (1), and b represents the slope of the straight line in the test conducted under condition (2). As a result, stable battery performance (e.g., load bearing capacity) will be exhibited at a variety of charging/discharging rates including high rate charging/discharging, and battery capacity degradation can be effectively reduced even with use in a mode that includes repeated high rate charging/discharging. Thus, a lithium ion secondary battery with superb cycling characteristics can be provided.

In one preferred mode of the lithium ion secondary battery disclosed herein, the above forces F1 and F2 correspond to the upper and lower limits, respectively, of the loads that are applied to the above sheets in the predicted SOC range of a lithium ion secondary battery during normal use. In this mode, by predicting the load (pressure) that will be applied to each electrode assembly component during normal battery use over the SOC range (e.g., approximately 20% to 90%), at least one of the electrode assembly components can be imparted with sufficient load bearing capacity for normal battery use, and a lithium ion secondary battery having excellent cycling characteristics can be provided by using these electrode assembly components. The load that is applied to the above sheets at an 80% SOC, for example, can be used as the value for the above load F1. The load that is applied to the above sheets at a 30% SOC, for example, can be used as the value for the above load F2.

In one preferred mode of the lithium ion secondary battery disclosed herein, the above condition (1) can be a condition under which a load is applied at a rate of 23.5 [mN/second] until an upper limit of 235 [mN] is reached, and after maintaining the load at the upper limit for 10 seconds, the load is removed at a rate of 23.5 [mN/second] until a lower limit of 23.5 [mN] is reached, and the load is maintained at the lower limit for 10 seconds. The above condition (2) can be a condition under which a load is applied at a rate of 2.35 [mN/second] until an upper limit of 235 [mN] is reached, and then the load is removed at a rate of 2.35 [mN/second] until a lower limit of 23.5 [mN] is reached.

In one preferred mode of the lithium ion secondary battery disclosed herein, the above positive electrode sheet, negative electrode sheet, and separator sheet all satisfy the relationship 0.8<a/b<1.5. Because all of the electrode assembly components satisfy the relationship 0.8<a/b<1.5, a lithium ion secondary battery with excellent cycling characteristics can be provided wherein the decline in battery performance due to repeated use in a mode that includes high rate charging/discharging is even further reduced.

Moreover, the present invention provides a vehicle equipped with a lithium ion secondary battery produced by any of the methods disclosed herein or with any of the lithium ion secondary batteries disclosed herein. The lithium ion secondary battery provided by the present invention can exhibit characteristics (e.g., excellent cycling characteristics) appropriate for a vehicle-mounted lithium ion secondary battery. Therefore, such a lithium ion secondary battery can be preferably used as the electric power source for motors (electric motors) to be mounted in vehicles such as automobiles equipped with the kinds of electric motors found in hybrid automobiles, electric automobiles, and fuel-cell automobiles.

Moreover, the present invention provides a method for evaluating charging/discharging durability of at least one of the positive electrode sheet, negative electrode sheet, and separator sheet that are used in a lithium ion secondary battery having an electrode assembly formed of superimposed positive and negative electrode sheets, with a separator sheet being interposed therebetween. More specifically, in tests under each of following conditions (1) and (2):

Condition (1) a high rate loading-unloading cycle is repeated n times (n≥3) wherein the cycle includes a step for applying a load at a rate of A [mN/second] until a given load F1 [mN] is reached, and a step for removing the load at the rate of A [mN/second] until a given load F2 [mN] is reached, and Condition (2) a low rate loading-unloading cycle is repeated n times (n≥3) wherein the cycle includes a step for applying a load at a rate of B [mN/second] (B≤0.2 A) until a given load F1 [mN] is reached, and a step for removing the load at the rate of B [mN/second] until a given load F2 [mN] is reached, this method comprising:

a step of defining the thickness of the sheets before starting the test as a value of 100%, with the thickness of the sheets being the vertical axis and the number of loading-unloading cycles being the horizontal axis, and plotting and extrapolating the changes in the thickness of the sheets from cycles 1 to n under load F1 and the changes in the thickness of the sheets from cycles 1 to n under load F2 on a graph, and determining the thickness of the sheets and the number of loading-unloading cycles corresponding to convergence points of these distributions; a step of determining slopes of the straight lines connecting the thickness of the sheets before starting the tests to the convergence points; and a step of, when a represents the slope of the straight line in the test conducted under condition (1) and b represents the slope of the straight line in the test conducted under condition (2), judging that a component is within specifications when the relationship 0.8<a/b<1.5 is satisfied, and judging that a component is outside of specifications when the relationship is not satisfied.

The evaluation method provided by the present invention enables the selection of electrode assembly components suitable for constructing a lithium ion secondary battery with excellent battery performance even with use in a mode that includes repeated high rate charging/discharging.

Examples of preferable applications of the technology disclosed herein include: a lithium ion secondary battery that is expected to be usable at an operating cycle that includes a high rate discharge of 50 A or higher (e.g., 50 A to 250 A) and additionally of 100 A or higher (e.g., 100 A to 200 A); and a high capacitance type lithium ion secondary battery with a theoretical capacitance of 1 Ah or higher (additionally 3 Ah or higher) that is expected to be usable at an operating cycle that includes a high rate discharge of 5 C or higher (e.g., 5 C to 50 C) and additionally of 20 C or higher (e.g., 20 C to 40 C), etc.

Moreover, a lithium ion secondary battery with a configuration wherein the electrode assembly is housed in a prismatic (typically a flat rectangular prism) battery case is included as an example of a preferred application of the technology disclosed herein.

Furthermore, a lithium ion secondary battery pack wherein a plurality of the above prismatic lithium ion secondary batteries (single cells) are aligned with the flat surfaces thereof in contact with one another and bound in the same alignment direction is included as a more preferable configuration.

DESCRIPTION OF EMBODIMENTS

Figure 1:
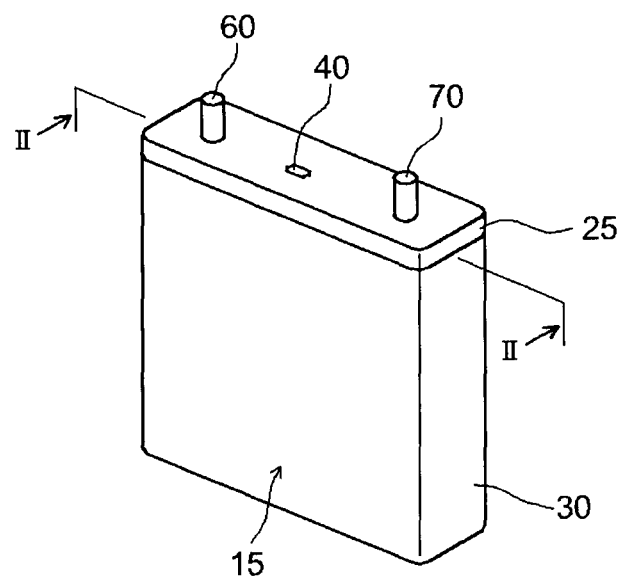
FIG. 1 is a perspective view schematically illustrating the exterior shape of the lithium ion secondary battery in one embodiment.

A preferred embodiment of the present invention is described below. It should also be noted that matters necessary for carrying out the present invention other than those specifically referred to in the description are understood to be matters of design for a person skilled in the art based on the prior art in this field. The present invention can be carried out on the basis of the content disclosed herein and common technical knowledge in this field.

In the method for producing a lithium ion secondary battery disclosed herein, at least one component, i.e., positive electrode sheet, negative electrode sheet, or separator sheet is used wherein the ratio (a/b) of the above slopes a and b lies in the given range.

A preferred example of the method that can be used to obtain the above slopes a and b is described below.

First, the pressure P [MPa] that is applied to the electrode assembly (i.e., the electrode assembly components comprising the positive electrode sheet, negative electrode sheet, and separator sheet) is measured during normal use under a high rate condition (e.g., 10 C to 30 C) in the predicted SOC range (e.g., a range of approximately 20% to 90%, a range of approximately 20% to 80%, a range of approximately 30% to 80%, etc.) of a lithium ion secondary battery that is the object of application of the technology disclosed herein. For example, given that a battery pack (typically, a plurality of lithium ion secondary batteries (single cells) are aligned in a given direction and bound such that a given binding force is applied) has already been constructed, a measurement is performed by inserting a commercial pressure sensor into an electrode assembly of the single cell to which the binding force has been applied (the single cell has been clamped externally).

The load (test force) F [mN] that is applied to the electrode assembly components is measured as the change in pressure (approximately 0.5 MPa to 12 MPa, e.g., 1 MPa to 10 MPa) from this state. The load F is obtained from the relationship $F=P/S$ where S [mm$^2$] is the surface area of the part wherein the electrode assembly components are in contact with the indenter that applies a load to the electrode assembly components.

Here, the pressure applied to the electrode assembly components is typically the largest at the upper limit and the smallest at the lower limit of the SOC range predicted for normal use. Therefore, the value of the pressure at the upper limit and lower limit of the above SOC range can normally be used as P1 and P2, respectively. Furthermore, preferably the load (test force) F that is applied to the electrode assembly components lies in the range F2≤F≤F1 where load F1 is used as the load corresponding to the maximum pressure P1 that is applied to the electrode assembly components and the load F2 is used as the load corresponding to the minimum pressure P2 that is applied to the electrode assembly components.

Moreover, the cycle changes of the loads that are applied to and removed from the electrode assembly components during different charging/discharging rates are simulated by changing the loading rate at which the load (test force) F is applied to and removed from the electrode assembly components. For example, if current flows for t seconds (t>0) during high rate use (i.e., fast cycle), then the loading rate A [mN/second] is set such that it takes t seconds to reach the above maximum load F1. Then, the time that current flows during low rate use (i.e., slow cycle) is set at a multiple x (e.g., x≥5, preferably x≥10) of the time that current flows during high rate use. In other words, if current flows for t seconds during high rate use, then the loading rate B [mN/second] (B≤0.2 A) is set such that it takes (t×x) seconds to reach the above maximum load F1.

Next, a load is applied to the electrode assembly components at the above fast cycle loading rate A [mN/second] until the above load F1 [mN] is reached (the load F1 can be maintained as needed), and then the load is removed at the above loading rate A [mN/second] until the above load F2 [mN] is reached (the load F2 can be maintained as needed). This cycle (high rate loading-unloading cycle) is repeated n times (n≥3, e.g. n is 3 to 10, and preferably n is 3). Herein, each time the electrode assembly components are both loaded (the process wherein a load is applied until the load F1 is reached) and unloaded (the process wherein the load is removed until the load F2 is reached) constitutes one cycle. Similarly, a load is applied to the electrode assembly components at the above slow cycle loading rate B [mN/second] until the above load F1 [mN] is reached (the load F1 can be maintained as needed), and then the load is removed at the above loading rate B [mN/second] until the above load F2 [mN] is reached (the load F2 can be maintained as needed). This cycle (low rate loading-unloading cycle) is repeated n times (n≥3, e.g. n is 3 to 10, and preferably n is 3).

Figure 4:
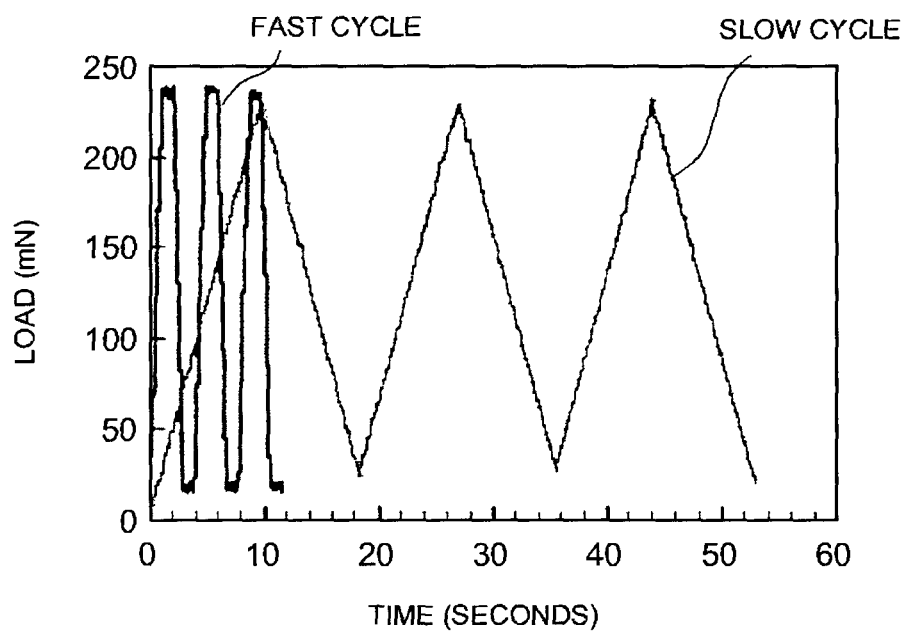
FIG. 4 is a graph illustrating the loading cycle patterns for a fast cycle and a slow cycle in the embodiment.

FIG. 4 is a graph illustrating the pattern of the loading cycle applied to the electrode assembly components in the embodiment described below. As shown in FIG. 4, in the fast cycle simulating high rate use, a load is applied at a loading rate A [mN/second] (here, 23.5 [mN/second]) until a load F1 [mN] (here, 235 [mN]) is reached, and after maintaining the load at F1 for 10 seconds, the load is removed at the above loading rate A until a load F2 [mN] (here, 23.5 [mN]) is reached, and the load is maintained at F2 for 10 seconds. This cycle is repeated three times. Moreover, in the slow cycle simulating low rate use, a load is applied at a rate B [mN/second] (here, 2.35 [mN/second]) until a load F1 [mN] (here, 235 [mN]) is reached, and then the load is removed at the rate B until a load F2 [mN] (here, 23.5 [mN]) is reached. This cycle is repeated three times. The patterns of the cycle changes of the loads that are applied to and removed from the electrode assembly components during different charging/discharging rates (fast cycle (high rate) and slow cycle (low rate)) can be simulated in this manner.

Under the above conditions, both the thickness of the electrode assembly components when the above load F1 [mN] is reached after loading the electrode assembly components at the above fast cycle loading rate A [mN/second] (compression ratio) and the thickness of the electrode assembly components when the above load F2 [mN] is reached after unloading the electrode assembly components at the rate A [mN/second] (recovery ratio) are determined, and this test is repeated n times.

The thickness of the electrode assembly components (sheet thickness) is assigned a value of 100(%) before conducting the above test thereon, and the sheet thickness (%) and number of loading-unloading cycles are represented by the vertical and horizontal axes, respectively, on a graph (odd numbers denote loading, even numbers denote unloading, and 1 cycle constitutes one loading process and one unloading process).

Moreover, the thickness of the electrode assembly components at the above load F1 (compression ratio) is expressed as a percentage in relation to the thickness of the electrode assembly components before starting the above test. Similarly, the thickness of the electrode assembly components at the above load F2 (recovery ratio) is expressed as a percentage in relation to the thickness of the electrode assembly components before starting the above test.

Figure 5:
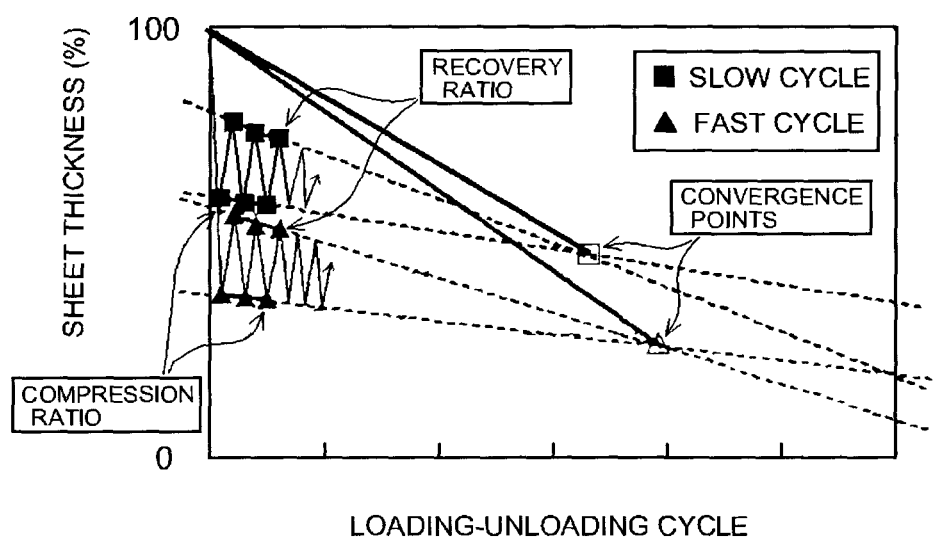
FIG. 5 is a conceptual diagram for explaining the method for obtaining the intersection points and the slopes of the straight lines for a fast cycle and a slow cycle.
Figure 6:
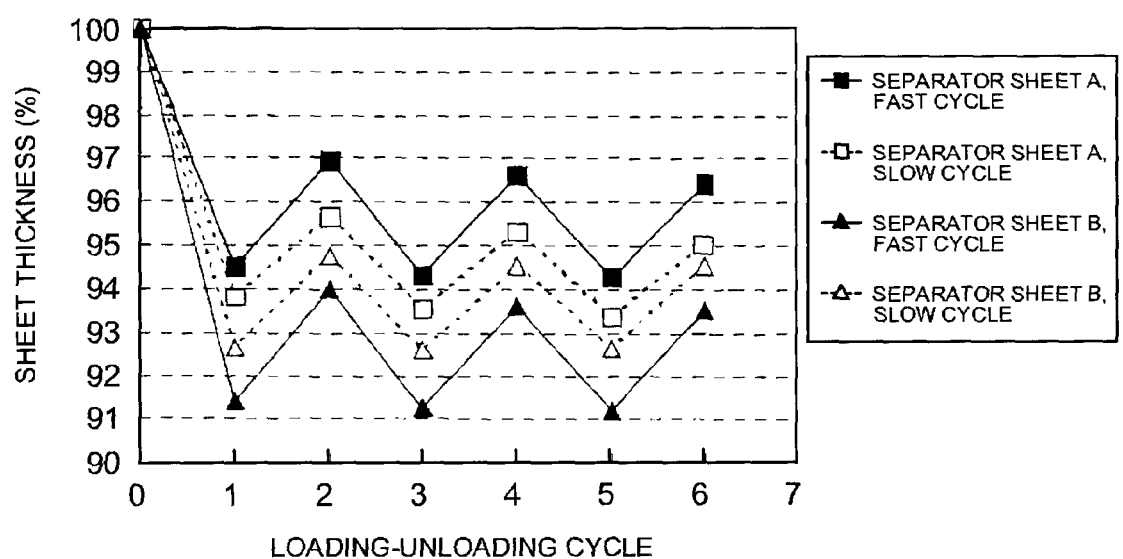
FIG. 6 is a graph illustrating the respective changes in sheet thickness of a separator sheet A and a separator sheet B for a fast cycle and a slow cycle.
Figure 7:
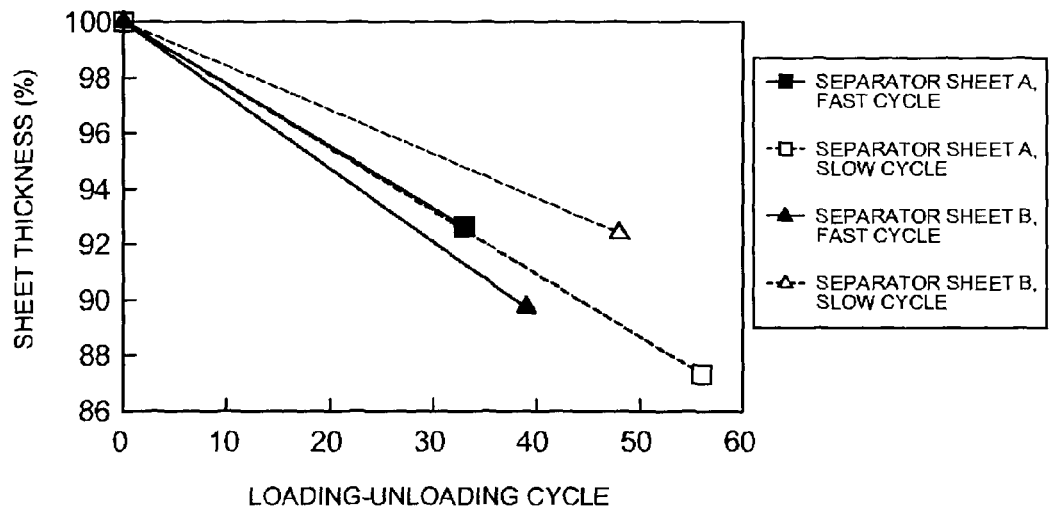
FIG. 7 is a graph illustrating the respective convergence points and slopes of the straight lines for separator sheet A and separator sheet B.
Figure 8:
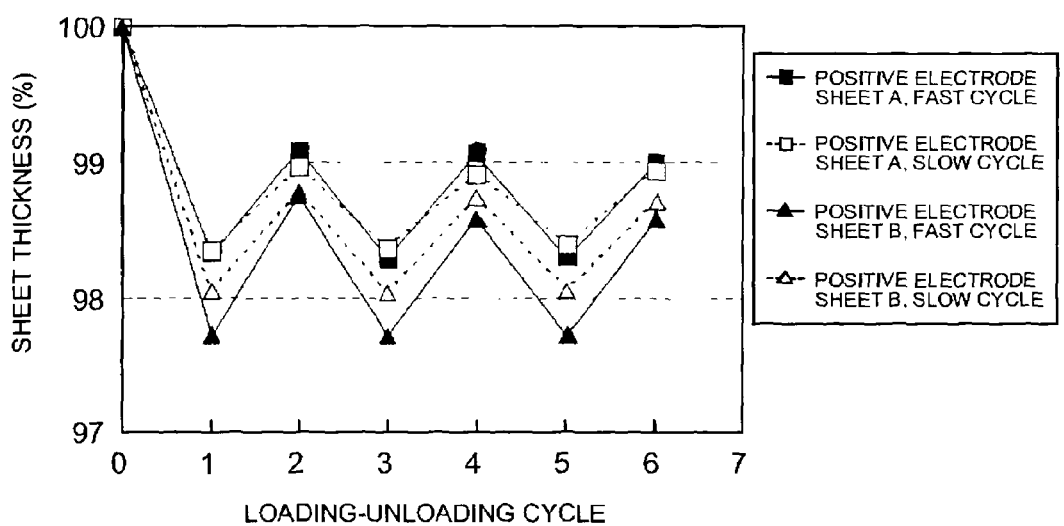
FIG. 8 is a graph illustrating the respective changes in sheet thickness of a positive electrode sheet A and a positive electrode sheet B for a fast cycle and a slow cycle.
Figure 9:
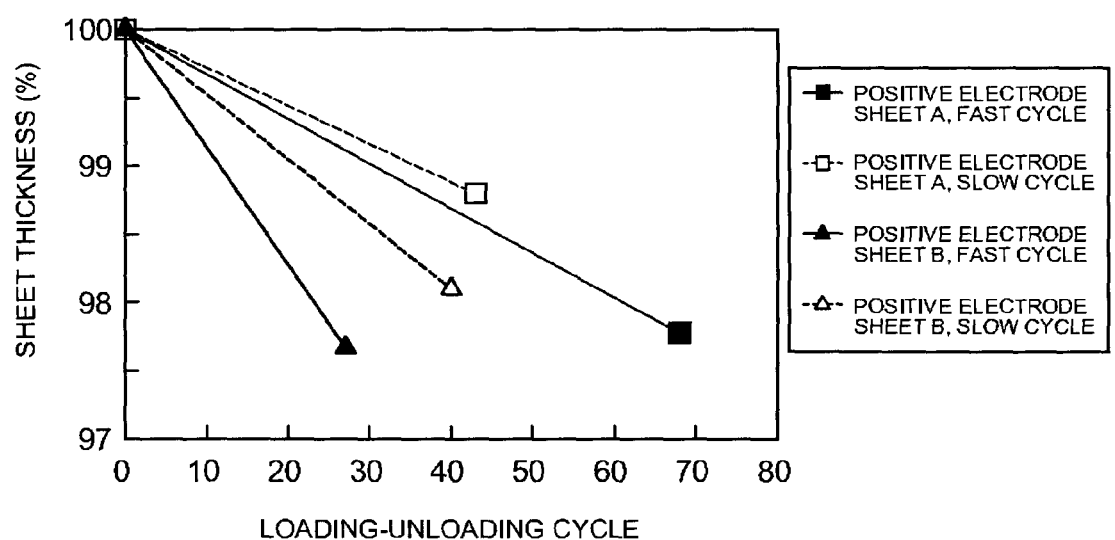
FIG. 9 is a graph illustrating the respective convergence points and slopes of the straight lines for positive electrode sheet A and positive electrode sheet B.
Figure 10:
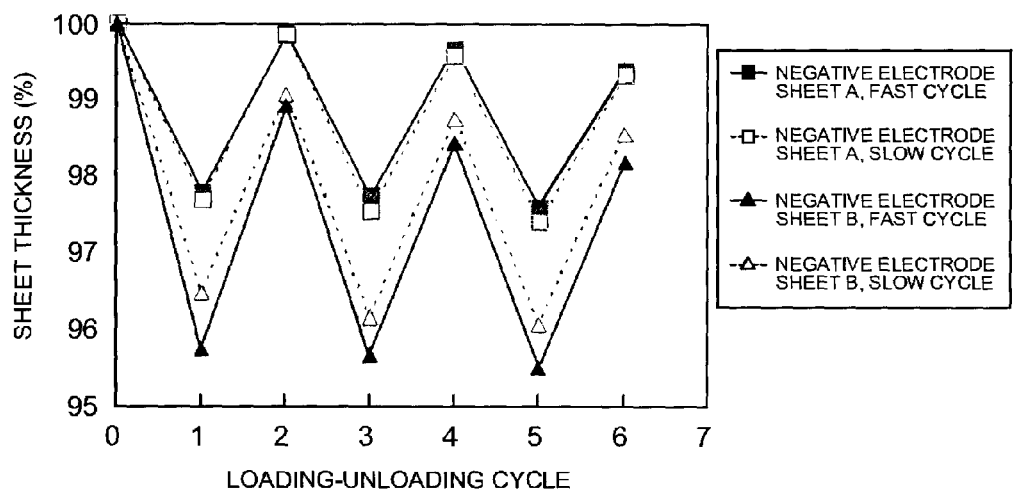
FIG. 10 is a graph illustrating the respective changes in sheet thickness of a negative electrode sheet A and a negative electrode sheet B for a fast cycle and a slow cycle.
Figure 11:
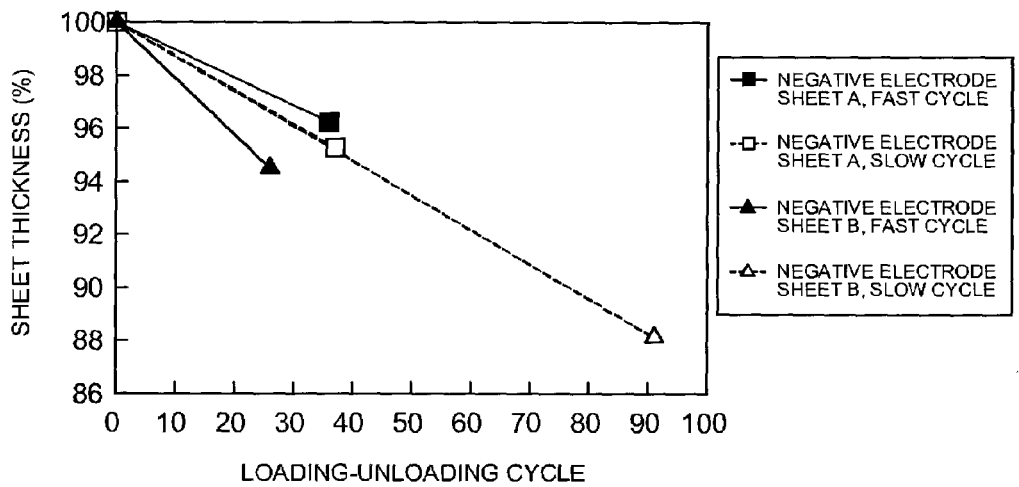
FIG. 11 is a graph illustrating the respective convergence points and slopes of the straight lines for negative electrode sheet A and negative electrode sheet B.

Next, as shown in FIG. 5, the changes in the sheet thickness from cycles 1 to n at the load F1 (compression ratio) and the changes in the sheet thickness from cycles 1 to n at the load F2 (recovery ratio) are each extrapolated (at this time it is assumed that the compression ratio and recovery ratio are each proportionally related to the numbers of loading-unloading cycles (cycle numbers)), and the sheet thickness (%) and the number of loading-unloading cycles at the intersection point (convergence point) thereof are obtained, and the variable a is obtained as the slope of a straight line connecting the above intersection point (convergence point) and the point denoting the sheet thickness before starting the test (i.e., the point denoting 100% sheet thickness at 0 cycles (0 number of times loading-unloading is conducted)). Similarly, the slope of the straight line when the test is conducted with the above slow cycle loading rate B [mN/second] is taken as the variable b. Thus, variables a and b can be obtained in this manner.

The method for evaluating the durability of the electrode assembly components to charging/discharging disclosed herein comprises a step of obtaining the ratio a/b of the slopes a and b of the straight lines obtained in the above fast cycle and slow cycle tests, respectively, and judging the component to be within specifications if this ratio a/b lies within a given numerical range or judging the component to be outside of specifications if the ratio lies outside of the given numerical range.

Here, the given numerical range is preferably 0.8<a/b<1.5. Therefore, a component would be judged within specifications when the relationship 0.8<a/b<1.5 is satisfied, and a component would be judged outside of specifications when the relationship a/b≤0.8 or a/b≥1.5 is satisfied. If the above ratio a/b is too much larger than 1.5, the differences between the changes in the sheet thickness during the fast cycle and the changes in sheet thickness during the slow cycle will be too great, and there is a danger of sheet deformation (typically in the electrode assembly) and a decline in battery performance not only in modes of use involving low rate charging/discharging, but also those involving high rate charging/discharging. More preferably the given numerical range is 0.8<a/b<1.2.

The following methods, etc., can be noted as methods of adjusting the given numerical range for the slope ratio a/b (i.e., the range of 0.8<a/b<1.5). For example, in the case of the separator sheet (typically, a porous resin sheet is used) of the electrode assembly components, the methods can include changing the separator sheet material, changing the separator thickness (film thickness), changing the separator sheet porosity, or changing air permeability of the separator sheet, etc.

Moreover, in the case of the positive electrode sheet of the electrode assembly components, the methods can include changing the properties of the positive electrode active material (e.g., particle size and shape, etc.), changing the composition of the positive electrode active material (e.g., type of binder and amount used, etc.), and changing the density of the positive electrode active material layer by changing the pressing method that is used during fabrication of the positive electrode sheet, etc. Herein the term "positive electrode active material" refers to an active material on the positive electrode that can reversibly absorb and desorb (typically store and release) a chemical species (in this case, lithium ions) serving as the charge carrier in the secondary battery.

Furthermore, in the case of the negative electrode sheet of the electrode assembly components, the methods can include changing the properties of the negative electrode active material (e.g., particle size and shape, etc.), and changing the density of the negative electrode active material layer by changing the pressing method that is used during fabrication of the negative electrode sheet, etc. Herein the term "negative electrode active material" refers to an active material on the negative electrode that can reversibly absorb and desorb (typically store and release) a chemical species (in this case, lithium ions) serving as the charge carrier in the secondary battery.

It should also be noted that the above tests can be conducted with a suitable device such as a dynamic ultra microhardness tester (DUH-W201, Shimadzu Corp.).

In the electrode assembly provided in the lithium ion secondary battery disclosed herein, the electrode assembly components (positive electrode sheet, negative electrode sheet, separator sheet) can take a configuration similar to that found in prior art provided at least one of the components is judged to be within specifications in the method for evaluating the electrode assembly components.

The positive electrode sheet (positive electrode) disclosed herein is a positive electrode for a lithium ion secondary battery comprising a positive electrode collector and a positive electrode active material layer formed thereon. A electrode collector made from the same metal materials as electrode collectors that are used in the positive electrodes of prior art lithium ion secondary batteries can be used as the positive electrode collector comprising such a positive electrode. For example, an aluminum material or an alloy consisting primarily of aluminum is preferred as the material for the positive electrode collector of this type of battery. Preferably the positive electrode collector is sheet-like, and the thickness thereof can be preferably set, for example, in the range of approximately 10 μm to 30 μm.

Moreover, the composition and form of the positive electrode active material contained in the positive electrode active material layer on the positive electrode sheet disclosed herein are not particularly limited herein provided that the positive electrode active material has properties enabling realization of the object of the present invention. An example of a typical positive electrode active material is a composite oxide comprising lithium and at least one type of transition metal element. For example, the positive electrode active material can be a lithium cobalt composite oxide ($LiCoO_2$), lithium nickel composite oxide ($LiNiO_2$), lithium manganese composite oxide ($LiMn_2O_4$); one of the so-called binary type lithium-containing composite oxides that contains two transition metals such as a nickel cobalt type written as $LiNi_xCo_{1-x}O_2$ (0<x<1), a cobalt manganese type written as $LiCo_xMn_{1-x}O_2$ (0<x<1), a nickel manganese type written as $LiNi_xMn_{1-x}O_2$ (0<x<1) or as $LiNi_xMn_{2-x}O_4$ (0<x<2); or a ternary type lithium-containing composite oxide that contains three transition metals such as a nickel cobalt manganese type.

Moreover, a polyanionic compound expressed with the general formula $LiMAO_4$ (where M is at least one metal element selected from a group consisting of Fe, Co, Ni, and Mn, and A is an element selected from a group consisting of P, Si, S, and V) can be preferably used as the above positive electrode active material. A polyanionic compound wherein A in the above general formula is P and/or Si (e.g., $LiFePO_4$, $LiFeSiO_4$, $LiCoPO_4$, $LiCoSiO_4$, $LiFe_{0.5}Co_{0.5}PO_4$, $LiFe_{0.5}Co_{0.5}SiO_4$, $LiMnPO_4$, $LiMnSiO_4$, $LiNiPO_4$, $LiNiSiO_4$) is particularly preferred.

Preferably, the tap density of the positive electrode active material disclosed herein lies, for example, within the range of approximately 1.2 g/cm³ (g/cc) to 1.7 g/cm³ (g/cc). It should also be noted that a value measured based on JIS Z 2512 can be used as the value for the tap density.

The compound constituting such a positive electrode active material can be produced and provided, for example, with prior art, publicly known methods. For example, such an oxide can be produced by mixing several suitable starting compounds selected on the basis of their atomic compositions in a given mole ratio and then calcining this mixture at a given temperature by suitable means. Moreover, a positive electrode active material powder substantially comprising secondary particles having a desired mean particle size and/or particle size distribution can be obtained by powdering, granulating, and sorting the calcined material by suitable means. It should also be noted that the method for producing the positive electrode active material (lithium-containing composite oxide powder, etc.) is not a characterizing feature of the present invention.

Moreover, the conductive material contained in the positive electrode active material layer formed on the positive electrode sheet (positive electrode) disclosed herein is not particularly limited and can be a material that is used in prior art secondary batteries. For example, carbon materials such as carbon powder or carbon fibers can be used. Carbon powders such as various types of carbon black (e.g., acetylene black, furnace black, Ketjen black) or graphite powder can be used as the carbon powder. One type can be used alone, or two or more types can be mixed and used together.

Furthermore, a polymer material that dissolves or disperses in water can be preferably used as the binder contained in the positive electrode active material layer formed on the positive electrode sheet (positive electrode) disclosed herein when a water-based liquid composition (typically a composition prepared as a paste or a slurry, hereinafter, "paste for forming the positive electrode active material layer") is used as the composition for forming the positive electrode active material layer. Polymer materials that dissolve in water (water-soluble) include cellulose polymers such as carboxymethyl cellulose (CMC), methyl cellulose (MC), cellulose acetate phthalate (CAP), and hydroxypropyl methylcellulose (HPMC); and polyvinyl alcohols (PVA), etc. Moreover, polymer materials that disperse in water (water-dispersible) include fluorinated resins such as polytetrafluoroethylene (PTFE), tetrafluoroethylene-perfluoro alkyl vinyl ether copolymer (PFA); vinyl acetate copolymers; and rubbers such as styrene-butadiene rubber (SBR), etc. Alternatively, polymer materials that are soluble in an organic solvent (nonaqueous solvent) such as polyvinylidene fluoride (PVDF) or polyvinylidene chloride (PVDC) can be used when a solvent-based liquid solvent composition is used as the composition for forming the positive electrode active material layer. It should also be noted that the polymer material listed above can be used as a thickener or other additive for the above composition in addition to being used as a binder.

Herein the term "water-based liquid composition" is a concept referring to a composition wherein water or a mixed solvent (water-based solvent) consisting primarily of water is used as the dispersion medium for the active material. One or more types of organic solvents (lower alcohols, lower ketones, etc.) that can mix homogenously with water can be suitably selected and used as a solvent other than water constituting the mixed solvent. Herein the term "solvent-based liquid solvent composition" is a concept referring to a composition wherein an organic solvent (nonaqueous solvent) is used primarily as the dispersion medium for the active material. For example, N-methylpyrrolidone (NMP), etc., can be used as the organic solvent.

In general, the positive electrode sheet (positive electrode) disclosed herein can be suitably produced, for example, by the following process. A paste for forming a positive electrode active material layer is prepared by dispersing the above positive electrode active material, a conductive material, and a binder soluble in an organic solvent, etc., in an organic solvent. A positive electrode sheet comprising a positive electrode collector and a positive electrode active material layer formed thereon can then be fabricated by applying the prepared paste to a sheet-shaped positive electrode collector and compressing (pressing) it after drying.

Next the components of the negative electrode sheet (negative electrode) for the lithium ion secondary battery disclosed herein will be described. The negative electrode sheet disclosed herein is a negative electrode sheet for a lithium ion secondary battery comprising a negative electrode collector and a negative electrode active material layer formed thereon. A copper or nickel material or an alloy consisting primarily of these materials can be preferably used as the negative electrode collector constituting such a negative electrode sheet. A sheet-shaped negative electrode collector is preferred. When a copper sheet is used, for example, the thickness thereof can be preferably set in the range of approximately 6 μm to 30 μm.

Moreover, one or more types of negative electrode active materials that are used in prior art lithium ion secondary batteries can be used without limitation as the negative electrode active material contained in the negative electrode active material layer formed on the negative electrode sheet (negative electrode) disclosed herein. Examples include carbon materials such as graphite; oxide materials such as lithium titanium oxide ($Li_4Ti_5O_{12}$), etc.; and alloy materials comprising alloys of tin, aluminum (Al), zinc (Zn), silicon (Si), etc. A typical example is a carbon material powder comprising graphite, etc. Graphite particles, for example, can be preferably used therefor.

Preferably the tap density of the negative electrode active material disclosed herein lies, for example, within the range of approximately 0.7 g/cm³ (g/cc) to 1.0 g/cm³ (g/cc). A value measured based on JIS Z 2512 can be used as the value for the tap density.

In addition to the negative electrode active material, the negative electrode active material layer formed on the negative electrode sheet (negative electrode) disclosed herein can comprise one or more of the materials that can be mixed into the above positive electrode active material layer as needed. Various types of materials capable of functioning as a binder, such as those listed above as constituent materials for the positive electrode active material layer, can be used as such a material in a similar manner.

The negative electrode sheet (negative electrode) disclosed herein can be produced by a process similar to that used for the positive electrode sheet (positive electrode). A paste or slurry composition (hereinafter, "paste for forming a negative electrode active material layer") is prepared by dispersing a negative electrode active material layer and binder, etc., in a suitable solvent. A negative electrode sheet having a negative electrode collector and a negative electrode active material layer formed thereon can then be fabricated by applying the prepared paste to the negative electrode collector and compressing (pressing) it after drying.

Moreover, a separator sheet similar to those previously used can be used as the separator sheet to be used together with both the positive and negative electrode sheets. For example, a porous sheet comprising a resin (microporous resin sheet) can be preferably used. A polyolefin resin such as polyethylene (PE), polypropylene (PP), and polystyrene is preferable as the material for such a porous sheet. In particular, a polyolefin sheet wherein a PE sheet and PP sheet are laminated to form a two-layer sheet with a PE layer and a PP layer, or to form a three-layer sheet with one PE layer interposed between two PP layers, etc., can be preferably used. In consideration of its use in a mode that includes repeated high rate charging/discharging, the thickness of the separator sheet is preferably set within the range of approximately 10 μm to 30 μm, for example, or more preferably within the range of approximately 15 μm to 25 μm. Moreover, the air permeability of the separator sheet is preferably set within the range of approximately 200 seconds/100 cc to 500 seconds/100 cc, for example, or more preferably within the range of approximately 300 seconds/100 cc to 400 seconds/100 cc. A separator sheet (e.g., a porous polyolefin sheet) for which the thickness and/or the air permeability lie within the above ranges facilitates attaining the preferred a/b ratio disclosed herein. It should also be noted that a value measured based on JIS P 8117 can be used as the value for the air permeability.

A nonaqueous electrolyte solution prepared by dissolving a lithium salt that can function as an electrolyte in a nonaqueous solvent (organic solvent) can be used as the electrolyte solution. A lithium salt that has conventionally been used in lithium ion secondary batteries can be suitably selected and used for such an electrolyte. Examples of such a lithium salt include $LiPF_6$, $LiClO_4$, $LiAsF_6$, $Li(CF_3SO_2)_2N$, $LiBF_4$, $LiCF_3SO_3$, etc. Only one type of electrolyte can be used alone, or two or more types can be mixed and used together. $LiPF_6$ can be noted as a particularly preferred example. Examples of the above nonaqueous solvent include carbonates such as ethylene carbonate (EC), ethyl methyl carbonate (EMC), dimethyl carbonate (DMC), diethyl carbonate (DEC), propylene carbonate (PC), etc. Only one type of nonaqueous solvent can be used alone or two or more types can be mixed and used together.

Below is a detailed description of the method for producing a lithium ion secondary battery using a component that has passed (i.e., has been judged to be within specifications) the method for evaluating electrode assembly components (evaluation test) as at least one of the components among the positive electrode sheet, negative electrode sheet, and separator sheet comprising the electrode assembly. A lithium ion secondary battery with such an electrode assembly housed in a battery case together with a nonaqueous electrolyte solution is used as an example, but this is by no means intended to limit embodiment of the present invention thereto. In other words, the form (shape and size) of the lithium ion secondary battery that is constructed is not particularly limited herein provided that it utilizes the electrode assembly for the lithium ion secondary battery disclosed herein. The battery can be a thin sheet type battery with an exterior comprising a laminate film, etc., it can have a prismatic or cylindrical outer battery case, etc., or it can be a small button type battery. A particularly preferred object of application is a prismatic battery case (typically of a flat rectangular shape).

It should also be noted that in the following drawings, all members and locations serving the same function are indicated by the same reference symbols, and redundant descriptions have been omitted. Moreover, the dimensional relationships (length, width, height, etc.) in the drawings do not necessarily depict actual dimensional relationships.

Figure 2:
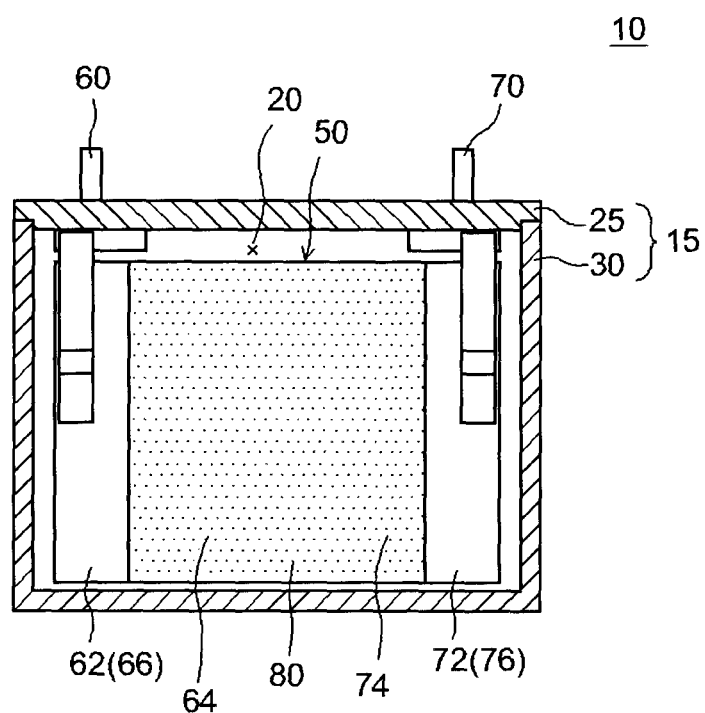
FIG. 2 is a vertical cross-sectional drawing along line II-II in FIG. 1.

FIG. 1 is a perspective view schematically illustrating the lithium ion secondary battery in one embodiment. FIG. 2 is a vertical cross-sectional drawing along line II-II in FIG. 1.

As shown in FIG. 1 and FIG. 2, the lithium ion secondary battery 10 in this embodiment comprises a wound electrode assembly 50 (hereinafter abbreviated as "electrode assembly 50") configured with at least one component among the positive electrode, negative electrode, and separator that has been judged to be within specifications in the above method for evaluating electrode assembly components (evaluation test), and a prismatic battery case 15 (typically with a flat rectangular shape) in which the electrode assembly 50 is housed along with a suitable nonaqueous electrolyte solution.

The case 15 comprises a flat rectangular box-shaped case body 30 with an opening 20 on one of the narrow faces thereof, and a lid 25 attached (e.g., welded) to the opening 20 to seal it. A material similar to one used in typical lithium ion secondary batteries can be suitably used as the material for the battery case 15, and is not particularly limited herein. For example, a container made of metal (e.g., aluminum, steel, etc.) or a container made of plastic (e.g., a resin with a high melting point such as a polyolefin resin, etc., or a polyamide resin, etc.) can be preferably used. The case 15 in the present embodiment is made of aluminum, for example.

The lid 25 has a rectangular shape to match the shape of the opening 20 in the case body 30. Furthermore, a positive terminal 60 and a negative terminal 70 for connection to the outside are provided in the lid 25 and formed such that a part of the terminals 60, 70 protrudes from the lid 25 and away from the case 15. Moreover, a safety valve 40 for discharging gases that may be generated inside the case 15 to the outside of the case 15 in the event of a battery malfunction is provided in the lid 25 just as in prior art lithium ion secondary batteries. The safety valve 40 can be used without any particular limitation as long as it provides the function of opening and discharging gases to the outside of the case 15 when the pressure within the case 15 rises and exceeds a given level.

As shown in FIG. 2, the lithium ion secondary battery 10 has a wound electrode assembly 50 as in conventional lithium ion secondary batteries. The electrode assembly 50 is housed in the case body 30 with the winding axis thereof oriented horizontally (i.e., the winding axis lies parallel to the plane of the opening 20). The electrode assembly 50 is formed by superimposing a positive electrode sheet (positive electrode) 66 comprising a sheet-shaped positive electrode collector 62 with a positive electrode active material layer 64 formed thereon, a negative electrode sheet (negative electrode) 76 comprising a sheet-shaped negative electrode collector 72 with a negative electrode active material layer 74 formed thereon, and two sheet-shaped separator sheets 80, winding the same, and then compressing the resulting electrode assembly 50 in the lateral direction to form a flattened shape.

Moreover, on the positive electrode sheet 66 to be wound there is an exposed part on one of the edges along the lengthwise direction wherein the positive electrode active material layer 64 is not formed on the positive electrode collector 62, and on the negative electrode sheet 76 to be wound there is also an exposed part on one of the edges along the lengthwise direction wherein the negative electrode active material layer 74 is not formed on the negative electrode collector 72. Next the positive terminal 60 is connected to the exposed edge of the positive electrode collector 62 and thereby electrically connected with the positive electrode sheet 66 of the flattened wound electrode assembly 50. Similarly, the negative terminal 70 is connected to the exposed edge of the negative electrode collector 72 and thereby electrically connected with the negative electrode sheet 76. It should also be noted that the positive and negative terminals 60, 70 can be connected with the respective positive and negative electrode collectors 62, 72, for example, by ultrasonic welding or resistance welding, etc.

The materials and components themselves constituting the wound electrode assembly 50 as configured above are not particularly limited herein and can be the same as those used in the electrode assemblies of prior art lithium ion secondary batteries provided that at least one positive electrode sheet, negative electrode sheet, or separator sheet is used that has been judged to be within specifications in the above method for evaluating electrode assembly components (evaluation test).

The positive electrode sheet 66 is fabricated by forming a positive electrode active material layer 64 on a sheet positive electrode collector 62 (e.g., a sheet aluminum foil). In other words, a paste for forming a positive electrode active material layer is prepared by dispersing a positive electrode active material (e.g., $LiCoO_2$), a conductive material (e.g., graphite), and an organic solvent-dispersible binder (e.g., PVDF) in an organic solvent (e.g., NMP). The positive electrode active material layer 64 is then formed by applying the prepared paste to the positive electrode collector 62 and compressing (pressing) it after drying.

Herein, the same techniques used in prior art, publicly known methods can be suitably used as the method for applying the above paste to the positive electrode collector 62. For example, the paste can be preferably applied to the positive electrode collector 62 by using a suitable application device such as a slit coater, die coater, gravure coater, or comma coater. Moreover, prior art, publicly known pressing methods such as roll pressing and plate pressing can be used as the pressing method. When adjusting the thickness, the thickness can be measured with a coating thickness gauge and multiple pressings can be performed while adjusting the pressing pressure until the desired thickness is achieved.

The negative electrode sheet 76 is fabricated by forming a negative electrode active material layer 74 on a sheet negative electrode collector 72 (e.g., a sheet copper foil). In other words, a paste for forming a negative electrode active material layer is prepared by dispersing a negative electrode active material (e.g., graphite) and an organic solvent-dispersible binder (e.g., PVDF) in an organic solvent (e.g., NMP). The negative electrode active material layer 74 is then formed by applying the prepared paste to the negative electrode collector 72 and compressing (pressing) it after drying. A detailed explanation of the method itself for forming the negative electrode active material layer 74 is omitted herein because it is the same as that used for the positive electrode sheet.

The lithium ion secondary battery 10 in the present embodiment can be constructed by laminating and winding the above positive electrode sheet 66, negative electrode sheet 76, and two separator sheets (e.g., made from a porous polyolefin resin) 80; housing the resulting wound electrode assembly 50 with the winding axis thereof oriented horizontally in the case body 30, and injecting thereinto a nonaqueous electrolyte solution such as a mixed solvent of EC and DMC (e.g., in a mass ratio of 1:1) that contains a suitable amount (e.g., a 1 M concentration) of a suitable supporting electrolyte (e.g., a lithium salt such as $LiPF_6$); and finally sealing the opening 20 by attaching the lid 25 (e.g., by laser welding).

It should also be noted that the method for producing a lithium ion secondary battery disclosed herein can be carried out using a component (that can be a component manufactured under certain conditions, a commercial part with a certain part number, etc.) selected in advance (e.g., by conducting experiments beforehand) that satisfies the above a/b ratio as at least one of the electrode assembly components (i.e., the positive electrode sheet, the negative electrode sheet, and separator sheet). In other words, for the sake of convenience, it is not necessary to verify whether the above component satisfies the a/b ratio every time the present invention is carried out.

Figure 3:
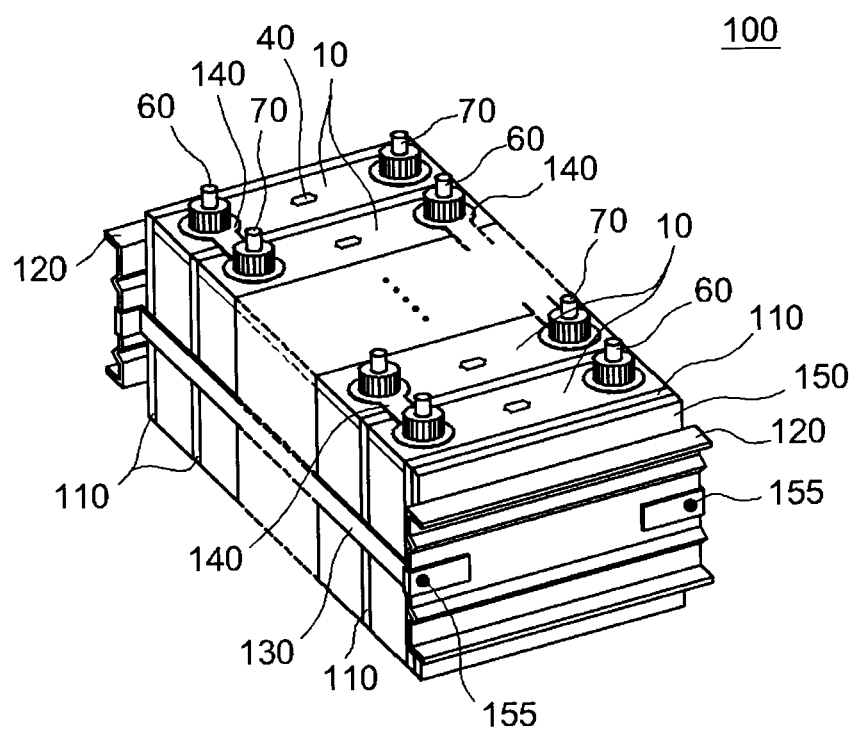
FIG. 3 is a perspective view schematically illustrating a battery pack in one embodiment.

Next a configuration of a battery pack having a plurality of the above lithium ion secondary batteries 10 as single cells will be described. As shown in FIG. 3, in a battery pack 100 a plurality of (typically 10 or more and preferably 10 to 30, e.g., 20) the lithium ion secondary battery (single cells) 10 will be aligned in a direction (the stacking direction) such that the wider surfaces of the cases 15 lie opposite each other, and each cell is reversed such that the positive terminal 60 of one cell alternates with the negative terminal 70 of the next. Cooling plates 110 of a given shape are inserted between the aligned single cells 10. These cooling plates 110 function as heat diffusers in order to effectively diffuse the heat generated within each of the single cells 10 during use, and preferably they have a form (e.g., a form wherein grooves are provided running vertically in parallel from one edge to the opposing edge on the surface of a rectangular cooling plate) that permits the flow of a cooling fluid (typically air) between the single cells 10. Preferably the cooling plates can be made from a metal or from hard lightweight polypropylene or another synthetic resin with good thermal conductivity.

As shown in FIG. 3, a pair of endplates (binding plates) 120 are provided on both ends of the aligned single cells 10 and cooling plates 110. Moreover, one or more sheet-shaped spacers 150 can be inserted between the outer cooling plates 110 and endplates 120 as a means of length adjustment. The aligned single cells 10, cooling plates 110, and spacers 150 are then bound with a restraining band 130 for fastening purposes such that a given binding pressure is applied in the stacking direction and both endplates are clamped. More specifically, the single cells, etc., are bound in the stacking direction such that a given binding pressure is applied by fastening and fixing the end of the restraining band 130 to the endplate 120 with a screw 155, as shown in FIG. 3. As a result, the binding pressure is also applied to the wound electrode assembly 50 housed within the battery case 15 of each single cell 10.

Next the positive terminals 60 on one side and negative terminals 70 on the other side of neighboring single cells 10 are electrically connected with a coupler (bus bar) 140. Thus, in this manner the battery pack 100 of a desired voltage is constructed by connecting the single cells 10 in series.

Next a number of examples regarding to the present invention are described, but it is by no means intended to limit the present invention to these specific examples.

First, the electrode assembly components used in the tests below will be described.

<Separator Sheet A>

A three-layer porous sheet (polypropylene/polyethylene/polypropylene) with an air permeability of 300 seconds/100 cc and a thickness of 20 μm was used.

<Separator Sheet B>

A three-layer porous sheet (polypropylene/polyethylene/polypropylene) with an air permeability of 400 seconds/100 cc and a thickness of 20 μm was used.

<Positive Electrode Sheet A>

A paste for forming a positive electrode active material layer was prepared by weighing out $LiNi_{1/3}Co_{1/3}Mn_{1/3}O_2$ as the positive electrode active material, acetylene black as the conductive material, and PVDF as the binder in a mass ratio of 85:10:5, and dispersing these ingredients in an NMP solvent. In this case $LiNi_{1/3}Co_{1/3}Mn_{1/3}O_2$ powder with a tap density of 1.4 g/cc was used. Positive electrode sheet A was fabricated by applying this paste to both sides of an aluminum foil with a thickness of 15 μm such that the total amount of paste on both sides was 13.8 mg/cm² (as solid content), and pressing after drying.

<Positive Electrode Sheet B>

A paste for forming a positive electrode active material layer was prepared by weighing out $LiNi_{1/3}Co_{1/3}Mn_{1/3}O_2$ as the positive electrode active material, acetylene black as the conductive material, and PVDF as the binder in a mass ratio of 85:10:5, and dispersing these ingredients in an NMP solvent. In this case $LiNi_{1/3}Co_{1/3}Mn_{1/3}O_2$ powder with a tap density of 1.8 g/cc was used. Positive electrode sheet B was fabricated in the same way as positive electrode sheet A except this paste was used instead.

<Negative Electrode Sheet A>

A paste for forming a negative electrode active material layer was prepared by weighing out graphite as the negative electrode active material and SBR as the binder in a mass ratio of 95:5, and dispersing these ingredients in a deionized water solvent. Graphite powder with a tap density of 0.8 g/cc was used. Negative electrode sheet A was fabricated by applying this paste to both sides of a copper foil with a thickness of 10 μm such that the total amount of paste on both sides was 5 mg/cm² (as solid content), and pressing after drying.

<Negative Electrode Sheet B>

A paste for forming a negative electrode active material layer was prepared by weighing out graphite as the negative electrode active material and SBR as the binder in a mass ratio of 95:5, and dispersing these ingredients in a deionized water solvent. Graphite powder with a tap density of 1.1 g/cc was used. Negative electrode sheet B was fabricated in the same way as negative electrode sheet A except that this paste was used instead.

[Durability Evaluation Test]

The following tests were performed for each of the above electrode assembly components.

The durability of each sheet to the loads that are applied during charging/discharging was evaluated by a repeated loading-unloading test (MODE 3) using a dynamic ultra microhardness tester (DUH-W201; Shimadzu Corp.) with each of the above sheets as the test specimens. The test conditions are shown below.

<Test Conditions>

Test loads: 23.5 mN (2.4 gf) to 235 mN (24 gf)

Loading rate: fast cycle; 23.5 mN/second, maintained for 10 seconds slow cycle; 2.35 mN/second, maintained for 0 seconds Number of cycles: 3

Indenter: truncated conical indenter (120°), 500 μm diameter

Test temperature: (25° C.)

It should also be noted that the test loads were determined by measuring the pressure values during normal use of a lithium ion secondary battery in a predicted SOC range (e.g., 20% to 80%) and then calculating the corresponding loads with the formula: test loads=pressure/0.0509.

FIG. 4 is a graph illustrating the changes in the load that is applied to a sheet during a fast cycle and during a slow cycle.

First, as shown in FIG. 4 a load was applied to each sheet with the cylindrical truncated cone indenter at the above fast cycle loading rate until the maximum load of 235 mN was reached. When the maximum load of 235 mN was reached, then the load was maintained for 10 seconds and the sheet thickness (compression ratio) was measured. Next, the load was removed at the above fast cycle loading rate until the minimum load of 23.5 mN was reached. When the maximum load of 23.5 mN was reached, then the load was maintained for 10 seconds and the sheet thickness (recovery ratio) was measured. This cycle was repeated three times. Similarly, as shown in FIG. 4, a load was applied to each sheet with the cylindrical truncated cone indenter at the above slow cycle loading rate until the maximum load of 235 mN was reached. When the maximum load of 235 mN was reached, then the sheet thickness (compression ratio) was measured. Next, the load was removed at the above slow cycle loading rate until the minimum load of 23.5 mN was reached. Then the sheet thickness (recovery ratio) was measured. This cycle was repeated three times.

Next, the changes in the compression ratio and recovery ratio for each sheet and for each cycle were each extrapolated and the sheet thickness and loading-unloading cycle number at the intersection points (convergence points) of these two distributions were obtained, and the slopes of the straight lines connecting the above intersection points (convergence points) and the point denoting the sheet thickness before starting the test (the point denoting 100% sheet thickness at 0 loading-unloading cycles) were determined. Then the slope ratio X of the slope of the line in the fast cycle to the slope of the line in the slow cycle was obtained. In this case, X=(fast cycle slope)/(slow cycle slope). The results are shown in Table 1 and FIG. 6 to FIG. 11.

TABLE 1

| Example | Electrode Assembly Component | Cycle Speed | Convergence Point (cycle number) | Sheet Thickness (%) | Slope | X |
|---|---|---|---|---|---|---|
| 1 | Separator Sheet A | Fast | 33 | 92.64 | −0.223 | 0.98 |
|   |   | Slow | 56 | 87.31 | −0.227 |   |
| 2 | Separator Sheet B | Fast | 39 | 89.73 | −0.263 | 1.66 |
|   |   | Slow | 48 | 92.41 | −0.158 |   |
| 3 | Positive Electrode Sheet A | Fast | 68 | 97.78 | −0.0326 | 1.17 |
|   |   | Slow | 43 | 98.80 | −0.0280 |   |
| 4 | Positive Electrode Sheet B | Fast | 27 | 97.67 | −0.0863 | 1.82 |
|   |   | Slow | 40 | 98.10 | −0.0474 |   |
| 5 | Negative Electrode Sheet A | Fast | 36 | 96.24 | −0.1046 | 0.81 |
|   |   | Slow | 37 | 95.27 | −0.1285 |   |
| 6 | Negative Electrode Sheet B | Fast | 26 | 94.51 | −0.2113 | 1.61 |
|   |   | Slow | 91 | 88.12 | −0.1309 |   |

[Battery Fabrication]

Example 7

An 18650 lithium ion secondary battery using separator sheet A was fabricated in the following manner.

A paste for forming a positive electrode active material layer was prepared by weighing out $LiNi_{1/3}Co_{1/3}Mn_{1/3}O_2$ as the positive electrode active material, acetylene black, and PVDF in a mass ratio of 85:10:5, and dispersing these ingredients in NMP. A positive electrode sheet (hereinafter, "positive electrode sheet C") was fabricated by applying this paste to both sides of an aluminum foil with a thickness of 15 μm such that the total amount of paste on both sides was 10 mg/cm² (as solid content), and pressing after drying.

A paste for forming a negative electrode active material layer was prepared by weighing out natural graphite as the negative electrode active material, CMC, and SBR in a mass ratio of 99:0.5:0.5, and dispersing these ingredients in deionized water. A negative electrode sheet (hereinafter, "negative electrode sheet C") was fabricated by applying this paste to both sides of a copper foil with a thickness of 10 μm such that the total amount of paste on both sides was 5 mg/cm² (as solid content), and pressing after drying.

A mixed solvent of EC, DMC, and EMC in a volume ratio of 3:5:2 wherein $LiPF_6$ was dissolved at a concentration of 1 mol/L was used for the nonaqueous electrolyte solution.

The lithium ion secondary battery in Example 7 was fabricated by superimposing and winding the obtained positive electrode sheet C and negative electrode sheet C along with two sheets of separator sheet A; compressing the resulting wound electrode assembly into a flattened form; and housing the electrode assembly in a cylindrical container along with the above electrolyte solution.

Example 8

The lithium ion secondary battery in Example 8 was fabricated in the same manner as in Example 7 except that for the separator sheets, separator sheet B used instead of separator sheet A.

Example 9

In this example, positive electrode sheet A was used instead of positive electrode sheet C from Example 7. In addition, a single-layer PE film (hereinafter, "separator sheet C") with a thickness of 20 μm and an air permeability of 290 seconds/100 cc was used for the separator sheets. In all other aspects the lithium ion secondary battery in Example 9 was fabricated in the same manner as in Example 7.

Example 10

The lithium ion secondary battery in Example 10 was fabricated in the same manner as in Example 9 except that positive electrode sheet B was used instead of positive electrode sheet A.

Example 11

In this example, negative electrode sheet A was used instead of negative electrode sheet C from Example 7. In addition, separator sheet C was used for the separator sheets. In all other aspects the lithium ion secondary battery in Example 11 was fabricated in the same manner as in Example 7.

Example 12

The lithium ion secondary battery in Example 12 was fabricated in the same manner as in Example 11 except that negative electrode sheet B was used instead of negative electrode sheet A.

[Charging/Discharging Cycle Test]

The following tests were performed for each of the batteries in Examples 7 to 12.

The above batteries were charged to a 60% SOC by charging at a constant current of 10 C to a voltage of 3.25 V and then continuing the charge at a constant voltage (CC-CV charging). Next the internal resistance (initial internal resistance) of the batteries prepared in this manner was measured. More specifically, at a temperature of 25° C. the open circuit voltage of each battery was measured before discharging it at a constant current of 10 C for 10 seconds. The voltage of each battery was measured again after discharging it at a constant current of 10 C for 10 seconds to obtain the voltage drop, which was then divided by the discharge current to obtain the initial internal resistance.

After measurement of the initial internal resistance each battery was returned to a 60% SOC, and the increase in internal resistance of each lithium ion secondary battery was measured after 4000 charging/discharging cycles at a temperature of 25° C. In other words, 4000 cycles were performed at a temperature of 25° C., where a cycle consisted of a 10 seconds discharge at a rate of 20 C followed by a 5 seconds resting period and then a 100 seconds charge at a rate of 2 C followed by a 145 seconds resting period.

Then after 4000 cycles, the open circuit voltage of each battery was measured before discharging it at a constant current of 10 C for 10 seconds. The voltage was measured again after discharging it at a constant current of 10 C for 10 seconds to obtain the voltage drop, which was divided by the discharge current to obtain the internal resistance (internal resistance after the cycling test). The increase in internal resistance (%) after 4000 cycles was obtained with the following formula: {(internal resistance after cycling test)−(initial internal resistance)}/(initial internal resistance)×100. The results are shown in Table 2.

Moreover, after measurement of the increase in internal resistance each battery was returned to a 60% SOC, and the increase in internal resistance of each lithium ion secondary battery was measured after 4000 charging/discharging cycles at a temperature of −15° C. In other words, 4000 cycles were performed at a temperature of −15° C., where a cycle consisted of a 10 seconds discharge at a rate of 20 C followed by a 5 seconds resting period and then a 100 seconds charge at a rate of 2 C followed by a 145 seconds resting period. The increase in internal resistance (%) after 4000 cycles was obtained in the same manner as above. The results are shown in Table 2.

TABLE 2

| Example | Electrode Assembly Component | | | X | Increase in Internal Resistance (%) | |
| | Separator Sheet | Positive Electrode Sheet | Negative Electrode Sheet | | 25° C. | −15° C. |
| --- | --- | --- | --- | --- | --- | --- |
| 7 | A | C | C | 0.98 | 13 | 21 |
| 8 | B | C | C | 1.66 | 27 | 74 |
| 9 | C | A | C | 1.17 | 10 | 5 |
| 10 | C | B | C | 1.82 | 35 | 90 |
| 11 | C | C | A | 0.81 | 11 | 16 |
| 12 | C | C | B | 1.61 | 41 | 73 |

As shown in Table 2, there were a 13% or lower increase in internal resistance at 25° C. and a 21% or lower increase at −15° C. for examples 7, 9, and 11, which comprised an electrode assembly component (positive electrode sheet, negative electrode sheet, or separator sheet) wherein the ratio X of the fast cycle slope to the slow slope was within the range of $0.8<X<1.5$. They were lower than those for examples 8, 10, and 12, which comprised an electrode assembly component wherein X lay outside the above range. A particularly dramatic difference in the increase in internal resistance at $-15°$ C. was observed.

[Battery Fabrication]

Example 13

The lithium ion secondary battery in Example 13 was fabricated in the same manner as in Example 7 except that a wound electrode assembly comprising separator sheet A, positive electrode sheet A, and negative electrode sheet A was used.

Example 14

The lithium ion secondary battery in Example 14 was fabricated in the same manner as in Example 13 except that separator sheet B, positive electrode sheet B, and negative electrode sheet B were used.

Example 15

The lithium ion secondary battery in Example 15 was fabricated in the same manner as in Example 13 except that negative electrode sheet B was used instead of negative electrode sheet A.

Example 16

The lithium ion secondary battery in Example 16 was fabricated in the same mariner as in Example 13 except that positive electrode sheet B was used instead of positive electrode sheet A.

Example 17

The lithium ion secondary battery in Example 17 was fabricated in the same manner as in Example 13 except that separator sheet B was used instead of separator sheet A.

Example 18

Here, separator sheet B was used instead of separator sheet A. In addition, negative electrode sheet B was used instead of negative electrode sheet A. In all other aspects the lithium ion secondary battery in Example 18 was fabricated in the same manner as in Example 13.

Example 19

Positive electrode sheet B was used instead of positive electrode sheet A. In addition, negative electrode sheet B was used instead of negative electrode sheet A. In all other aspects the lithium ion secondary battery in Example 19 was fabricated in the same manner as in Example 13.

Example 20

Here, separator sheet B was used instead of separator sheet A. In addition, positive electrode sheet B was used instead of positive electrode sheet A. In all other aspects the lithium ion secondary battery in Example 20 was fabricated in the same manner as in Example 13.

[Charging/Discharging Cycle Test]

Figure 12:
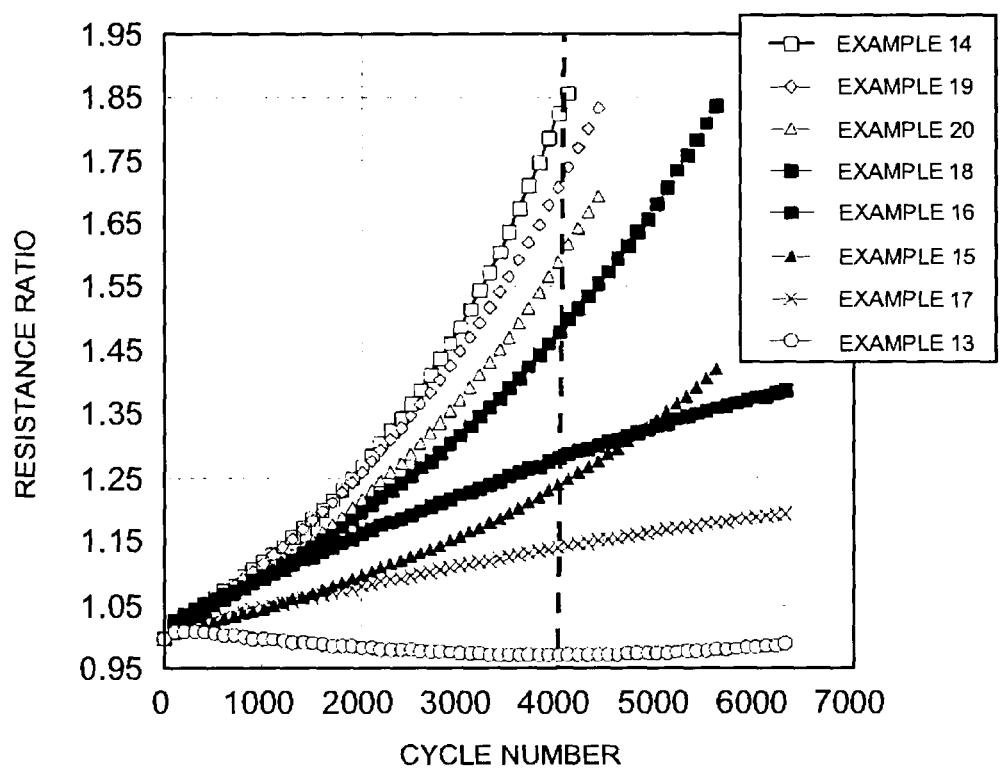
FIG. 12 is a graph illustrating the changes in the resistance ratio of the lithium ion secondary batteries of Examples 13 to 20 in a charging/discharging cycle test.
Figure 13:
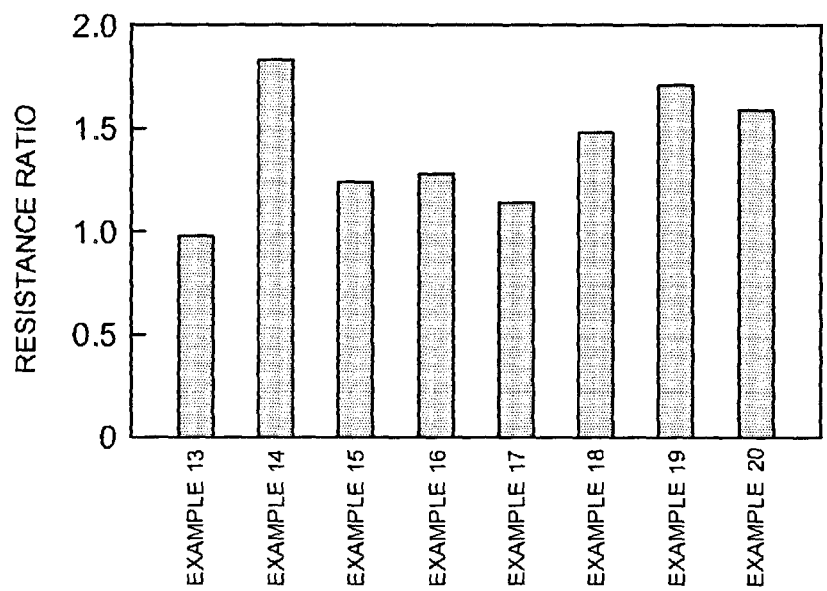
FIG. 13 is a graph illustrating the resistance ratio of lithium ion secondary batteries in Examples 13 to 20 in a charging/discharging cycle test (at 4,000 cycles)

A charging/discharging cycle test was performed for each battery in Examples 13 to 20 under the same conditions as in the charging/discharging test that was performed for each of the above batteries in Examples 7 to 12 (measurement temperature of 25° C.). Then the resistance ratio, which is the ratio of internal resistance after 4000 cycles to the initial internal resistance, was obtained for each battery. The results are shown in Table 3 and FIGS. 12 and 13.

TABLE 3

| Example | Electrode Assembly Component | | | Resistance Ratio |
|---|---|---|---|---|
| | Separator Sheet | Positive Electrode Sheet | Negative Electrode Sheet | |
| 13 | A | A | A | 0.98 |
| 14 | B | B | B | 1.83 |
| 15 | A | A | B | 1.24 |
| 16 | A | B | A | 1.28 |
| 17 | B | A | A | 1.14 |
| 18 | B | A | B | 1.48 |
| 19 | A | B | B | 1.71 |
| 20 | B | B | A | 1.59 |

As shown in Table 3, the resistance ratio was the smallest for the battery in Example 13 where all of the electrode assembly components (separator sheet, positive electrode sheet, and negative electrode sheet) satisfied the relationship $0.8<X<1.5$, and almost no change in internal resistance was observed even after 4000 cycles. The resistance ratio was the next smallest for batteries wherein two of the electrode assembly components had X values within the above range (Examples 15, 16, and 17). Conversely, the resistance ratio was the largest for the battery in Example 14 wherein all of the electrode assembly components had X values outside of the above range, and the largest increase in internal resistance was observed. The above findings show that it is possible to fabricate a lithium ion secondary battery having excellent cycling characteristics by suitably combining electrode assembly components that satisfy the relationship $0.8<X<1.5$.

Specific examples of the present invention were described in detail above, but these are nothing more than examples and do not limit the scope of the claims in any way. The technology listed in the claims also includes a variety of variations and modifications to the specific examples listed above.

INDUSTRIAL APPLICABILITY

Figure 14:
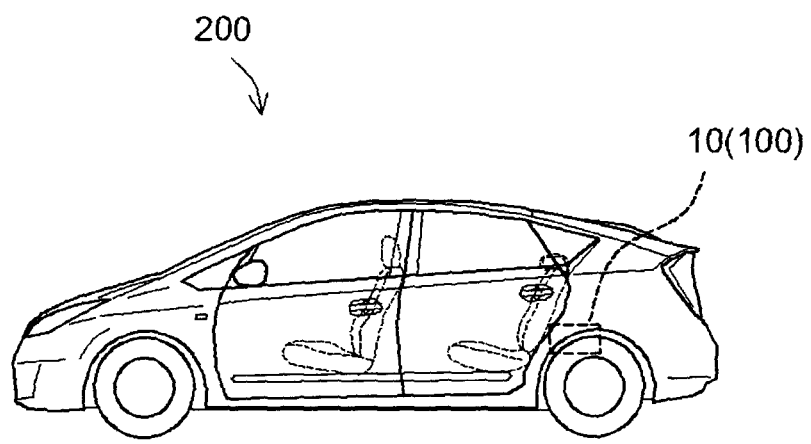
FIG. 14 is a side view schematically illustrating a vehicle (an automobile) equipped with a battery relating to the present invention.

The lithium ion secondary battery of the present invention can preferably be used as the electric power source for a motor (electric motor) to be mounted in a vehicle, particularly an automobile, because it can provide high current output and has excellent cycling characteristics as described above. Therefore, as illustrated schematically in FIG. 14, the present invention provides a vehicle (typically an automobile, and in particular an automobile equipped with an electric motor of the sort found in hybrid automobiles, electric automobiles, and fuel-cell automobiles) 200 equipped with a lithium ion secondary battery 10 (typically a battery pack 100 comprising a plurality of individual cells 10 that are connected in series) as the electric power source.

REFERENCE SIGNS LIST

10 Lithium ion secondary battery
15 Battery case

20 Opening
25 Lid
30 Case body
40 Safety valve
50 Electrode assembly
60 Positive terminal
62 Positive electrode collector
64 Positive electrode active material layer
66 Positive electrode sheet
70 Negative terminal
72 Negative electrode collector
74 Negative electrode active material layer
76 Negative electrode sheet
80 Separator sheet
100 Battery pack
110 Cooling plate
120 Endplate
130 Restraining band
140 Coupler (bus bar)
150 Spacer
155 Screw
200 Vehicle

The invention claimed is:

1. A method for producing a lithium ion secondary battery having an electrode assembly formed of superimposed positive and negative electrode sheets, with a separator sheet being interposed therebetween, the method comprising:
selecting a positive electrode sheet, negative electrode sheet, and separator sheet;
constructing an electrode assembly by superimposing the selected positive electrode sheet, negative electrode sheet, and separator sheet; and
housing in a battery case the electrode assembly along with an electrolyte solution,
wherein at least one of the positive electrode sheet, negative electrode sheet, and separator sheet satisfies the relationship $0.8 < a/b < 1.5$ when, in tests under conditions (1) and (2) below:
Condition (1) a high rate loading-unloading cycle is repeated n times ($n \geq 3$), the cycle including a step of applying a load at a rate of A [mN/second] until a given load F1 [mN] is reached, and a step of removing the load at the rate of A [mN/second] until a given load F2 [mN] is reached, and
Condition (2) a low rate loading-unloading cycle is repeated n times ($n \geq 3$), the cycle including a step of applying a load at a rate of B [mN/second] ($B \leq 0.2$ A) until a given load F1 [mN] is reached, and a step of removing the load at the rate of B [mN/second] until a given load F2 [mN] is reached,
a value of 100% is defined as the thickness of the sheets before starting the test, with the thickness of the sheets being the vertical axis and the number of loading-unloading cycles being the horizontal axis, the changes in the thickness of the sheets from cycles 1 to n under load F1 and the changes in the thickness of the sheets from cycles 1 to n under load F2 are plotted and extrapolated on a graph; the thickness of the sheets and the number of loading-unloading cycles corresponding to convergence points of these distributions are determined; slopes of the straight lines connecting the thickness of the sheets before starting the tests to the convergence points are determined; and
when a represents the slope of the straight line in the test conducted under condition (1), and b represents the slope of the straight line in the test conducted under condition (2).

2. The production method according to claim 1, wherein the loads F1 and F2 are the upper limit and lower limit, respectively, of the loads that are applied to the sheets during normal battery use in a predicted SOC range.

3. The production method according to claim 1, wherein the load F1 is the load that is applied to the sheets when the battery is at an 80% SOC, and the load F2 is the load that is applied to the sheets when the battery is at a 30% SOC.

4. The production method according to claim 1, wherein the conditions (1) and (2) are as follows respectively:
Condition (1) a load is applied at a rate of 23.5 [mN/second] until an upper limit of 235 [mN] is reached, and after maintaining the load at the upper limit for 10 seconds, the load is removed at a rate of 23.5 [mN/second] until a lower limit of 23.5 [mN] is reached, and the load is maintained at the lower limit for 10 seconds; and
Condition (2) a load is applied at a rate of 2.35 [mN/second] until an upper limit of 235 [mN] is reached, and then the load is removed at a rate of 2.35 [mN/second] until a lower limit of 23.5 [mN] is reached.

5. The production method according to claim 1, wherein the positive electrode sheet, negative electrode sheet, and separator sheet are selected such that all satisfy the relationship $0.8 < a/b < 1.5$.

6. A method for evaluating charging/discharging durability of at least one component among a positive electrode sheet, a negative electrode sheet, and a separator sheet that are used in a lithium ion secondary battery having an electrode assembly formed of superimposed positive and negative electrode sheets, with a separator sheet being interposed therebetween, wherein in tests under conditions (1) and (2) below:
Condition (1) a high rate loading-unloading cycle is repeated n times ($n \geq 3$), the cycle including a step of applying a load at a rate of A [mN/second] until a given load F1 [mN] is reached, and a step of removing the load at the rate of A [mN/second] until a given load F2 [mN] is reached, and
Condition (2) a low rate loading-unloading cycle is repeated n times ($n \geq 3$), the cycle including a step of applying a load at a rate of B [mN/second] ($B \leq 0.2$ A) until a given load F1 [mN] is reached, and a step of removing the load at the rate of B [mN/second] until a given load F2 [mN] is reached, the method comprising:
a step of defining the thickness of the sheets before starting the test as a value of 100%, with the thickness of the sheets being the vertical axis and the number of loading-unloading cycles being the horizontal axis, and plotting and extrapolating the changes in the thickness of the sheets from cycles 1 to n under load F1 and the changes in the thickness of the sheets from cycles 1 to n under load F2 on a graph, and determining the thickness of the sheets and the number of loading-unloading cycles corresponding to convergence points of these distributions; a step of determining slopes of the straight lines connecting the thickness of the sheets before starting the tests to the convergence points; and a step of, when a represents the slope of the straight line in the test conducted under condition (1) and b represents the slope of the straight line in the test conducted under condition (2), judging that a component is within specifications when the relationship $0.8 < a/b < 1.5$ is satisfied, and judging that a component is outside of specifications when the relationship is not satisfied.

* * * * *